(12) United States Patent
Myerly et al.

(10) Patent No.: US 7,116,025 B2
(45) Date of Patent: Oct. 3, 2006

(54) ENDPLAY ADJUSTMENT SYSTEM AND METHOD

(75) Inventors: Robert Scott Myerly, El Paso, TX (US); Clark F Wilson, El Paso, TX (US)

(73) Assignee: Valeo Electric Systems, Inc., Auburn Hills, MI (US)

( * ) Notice: Subject to any disclaimer, the term of this patent is extended or adjusted under 35 U.S.C. 154(b) by 0 days.

(21) Appl. No.: 10/742,967

(22) Filed: Dec. 22, 2003

(65) Prior Publication Data

US 2005/0134131 A1    Jun. 23, 2005

(51) Int. Cl.
*H02K 5/16*  (2006.01)
*H02K 7/08*  (2006.01)
*F16C 23/00* (2006.01)

(52) U.S. Cl. ............................ 310/90; 310/83; 384/248
(58) Field of Classification Search .............. 310/75 R, 310/90, 42, 43; 74/606 R; 384/245, 248
See application file for complete search history.

(56) References Cited

U.S. PATENT DOCUMENTS

| | | | |
|---|---|---|---|
| 2,975,649 A | 3/1961 | Propst | |
| 3,068,713 A | 12/1962 | Davis | |
| 3,068,714 A | 12/1962 | Davis | |
| 3,302,477 A | 2/1967 | Grabowski | |
| 3,452,226 A | 6/1969 | Hettich | |
| 3,848,477 A * | 11/1974 | Giandinoto et al. | .......... 74/425 |
| 3,855,486 A | 12/1974 | Binder et al. | |
| 3,894,256 A | 7/1975 | Sholtz | |
| 4,031,610 A | 6/1977 | Singh et al. | |
| 4,972,113 A | 11/1990 | Newberg | |
| 5,087,847 A | 2/1992 | Giesbert et al. | |
| 5,144,738 A * | 9/1992 | Oyafuso | ....................... 29/596 |
| 5,357,160 A | 10/1994 | Kaneda et al. | |
| 5,485,044 A * | 1/1996 | Mackay et al. | ................ 310/90 |
| 5,794,326 A | 8/1998 | Kikly | |
| 5,973,429 A * | 10/1999 | Swensgard et al. | ............ 310/90 |
| 6,157,105 A * | 12/2000 | Kuragaki et al. | ......... 310/75 R |
| 6,805,024 B1 * | 10/2004 | Shufflebarger et al. | ... 74/606 R |
| 2001/0019231 A1 * | 9/2001 | Hir et al. | ................... 310/68 B |

FOREIGN PATENT DOCUMENTS

| | | |
|---|---|---|
| DE | 4116368 A1 * | 11/1992 |
| EP | 563410 A1 * | 10/1993 |

* cited by examiner

*Primary Examiner*—Darren Schuberg
*Assistant Examiner*—Erik Preston
(74) *Attorney, Agent, or Firm*—Jacox Meckstroth & Jenkins

(57) ABSTRACT

An endplay adjustment system and method is shown having a slider body that has a thrust surface that lies in a plane that is generally perpendicular to an axis of an armature and that can be driven toward the armature by a plunger body. After the plunger body is driven into a plunger-receiving area of the housing, an angled surface of the plunger engages a mating surface of a slider body which forces the thrust surface into an end of an armature of an electric motor. The plunger body may then be secured, adhered to or welded to the housing and/or the slider body to lock the slider body and plunger into place, thereby reducing or eliminating endplay associated with the armature shaft.

47 Claims, 4 Drawing Sheets

ENDPLAY ADJUSTMENT SYSTEM AND METHOD

BACKGROUND OF THE INVENTION

1. Field of the Invention

This invention concerns an endplay adjustment system and method for reducing or eliminating endplay associated with an armature of electric motor.

2. Description of the Related Art

Figure 11:
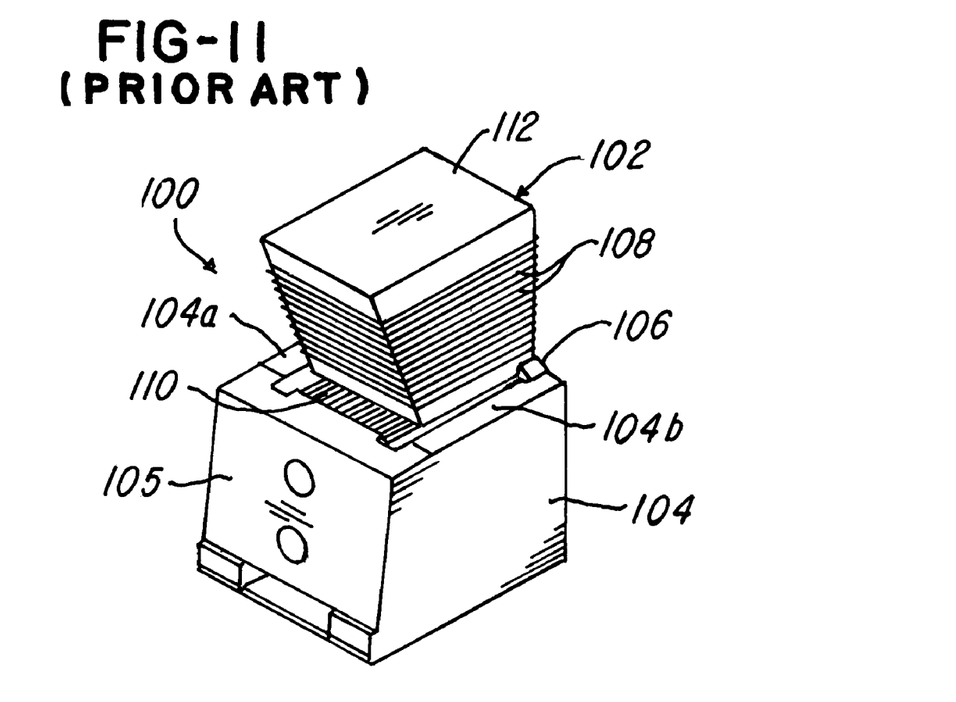
FIG. 11 is a view of a prior art endplay adjustment device.

FIG. 11 illustrates a prior art endplay adjustment system 100 used in an electric motor (not shown) having an armature (not shown) that drives a driven gear. The system 100 has a plunger 102 that is attached to a slider body 104 having an angled face 105 with attachment fingers 106. The plunger 102 comprises a plurality of interlocking ribs 108 that cooperate and lock against ribs 110 that are situated on the slider body walls 104a and 104b in order to lock the plunger 102 to the slider body 104.

The angled face 105 engages an end of the armature (not shown) when the system 100 is inserted in the motor. Due to angled face 105 of the slider body 104, there are large variations of stall torque between thrusting between the armature and the motor case side. This is caused by the angled face 105 side loading the armature shaft. This also increases friction in one thrust direction and a change in the worm angle in relation to a gear due to the flexure of the armature shaft. The stall torque variation is an undesirable trait for a bi-directional motor.

The angled face 105 also creates a high bending stress on the armature shaft of the electric motor when the motor stalls and the shaft thrusts against the angled face 105. This high stress requires that higher strength be used and stress-reducing features be added to the shaft geometry which impacts the cost of the armature shaft.

Moreover, the interlocking ribs 108 and 110 allow for an adjustment precision of approximately 0.15 mm and this is difficult to improve because it would require making the interlocking ribs 108 and 110 smaller. The interlocking ribs 108 and 110 must be made of a "soft" or flexible polymer to permit the interlocking ribs 108 and 110 to flex.

It has been found that the level of motor noise "growl" has been shown to correlate to an amount of axial force that is applied to the armature shaft as a result of the endplay adjustment process. The level of motor "clunk" noise correlates to the amount of gap that is allowed between the armature shaft and the endplay device. Due to the variation in friction between the plunger, slider body and gear housing walls, controlling the resulting axial force, while ensuring that there is no gap between the shaft and endplay device, is has been difficult. To ensure a maximum endplay gap is taken up, high forces are required to exert on the plunger top 112 downward (as viewed in FIG. 11) in order to engage the locking ribs 108 and 110.

One prior art design utilized a plunger 102 that was attached to the slider body 104 by the two attachment fingers (one of which is shown and labeled as 106 in FIG. 11). At times, the plunger 102 became tilted, relative to the slider body 104, the plunger will not engage the slider body 104 properly, thereby delaying or preventing the installation of the endplay adjustment system into the motor housing.

What is needed therefore is an endplay adjustment system and method which overcomes one or more of the problems associated with the prior art.

SUMMARY OF THE INVENTION

Objects of the invention are to provide an improved system and method for facilitating achieving at least one of the following: reducing or eliminating endplay; reducing undesired torque variation, bending stress or force on the armature shaft; providing a thrust surface that engages an end of an armature shaft in a substantially perpendicular manner; reducing noise in the electric motor; providing improved adjustment precision; and/or providing a plunger and slider body made of a material that is tougher and more resistant to deformation and creep than the materials used in the past.

In one aspect, this invention comprises an end play adjustment system for reducing axial end play in an electric motor having a housing, the end play adjustment system comprising a slider body comprising a thrust wall for driving into an end of an armature of the electric motor, and a plunger having a first angled surface for engaging the slider body in order to drive the slider body until the thrust wall engages the end of the armature the thrust wall lying in a plane that is substantially perpendicular to an axis of the armature.

In another aspect, this invention comprises an electric motor assembly comprising a housing for receiving an electric motor having an armature, a gear driven by the armature and rotatably driving a drive shaft, an end play adjustment system for reducing axial end play in the electric motor assembly, the end play adjustment system comprising: a slider body comprising a thrust wall for driving into an end of an armature of the electric motor, and a plunger having a first angled surface for engaging the slider body in order to drive the slider body until the thrust wall engages the end of the armature, the thrust wall lying in a plane that is substantially perpendicular to an axis of the armature.

In yet another aspect, this invention comprises a method for reducing end play in an electric motor assembly comprising a housing, the method comprising the steps of: situating a slider in operative relationship with an armature, the slider comprising a thrust wall for engaging an end of the armature, situating a plunger in operative relationship to the slider, and driving the plunger into engagement with the slider until the thrust wall engages the end of the armature.

Objects and advantages of the invention other than those noted above will be apparent from the following description, the accompanying drawings and the appended claims.

DETAILED DESCRIPTION OF THE INVENTION

Figure 1:
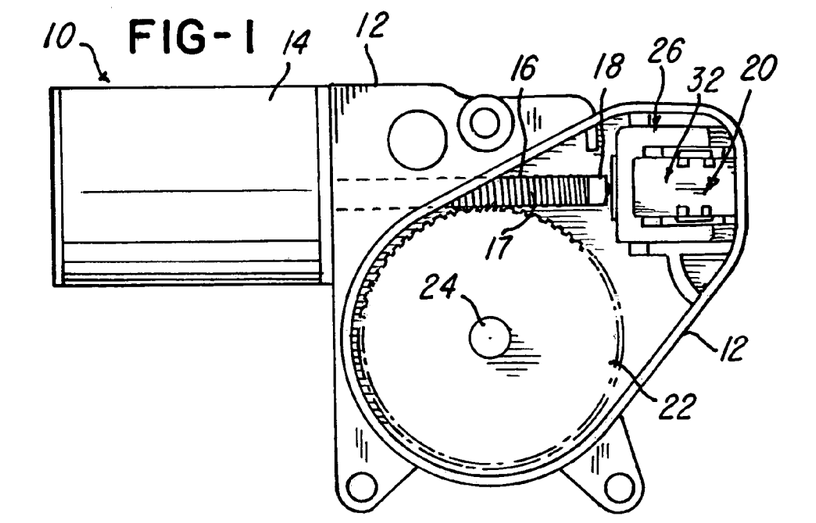
FIG. 1 is a schematic of an electric motor and housing comprising an endplay adjustment system in accordance with an embodiment of the invention.

Referring now to FIG. 1, an electric motor assembly or system 10 is shown. The electric motor 10 comprises a housing 12 coupled to a conventional electric motor 14 having a rotor (not shown), stator (not shown) and an armature 16 driven by the rotor. The armature 16 has a worm 17 and an end 18 which abuts to an endplay adjustment system 20 described later herein. The worm 17 drives a driven gear 22 which drives an output shaft 24 that is coupled to a driven member (not shown), such as a window, seat or the like, for performing work. The armature 16 comprises a worm 17 which drives the driven gear 22 to rotatably drive the output shaft 24. The electric motor 10 is preferably used to drive power windows, seats, sun roof or other adjuster mechanisms. In the embodiment being described, the electric motor 14 could be model number 24047663 available from Valeo Electrical Systems, Inc. of Auburn Hills, Mich.

Figure 3:
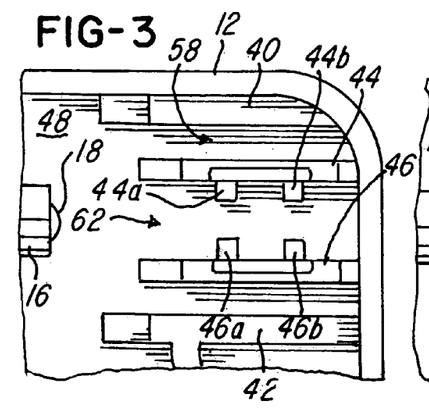
FIG. 3 is a fragmentary plan view without the endplay adjustment system situated in the housing.
Figure 4:
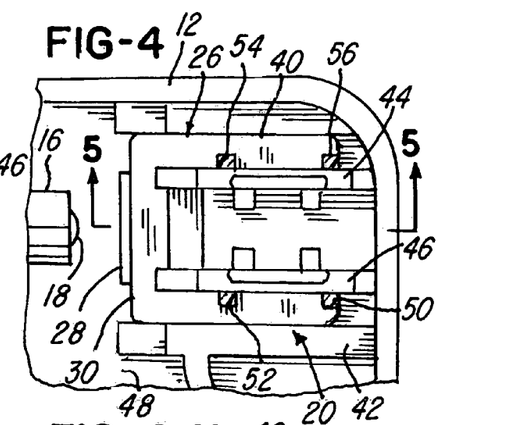
FIG. 4 is a fragmentary plan view illustrating the positioning of the plunger and slider body in a pre-deployed position.
Figures 5, 7:
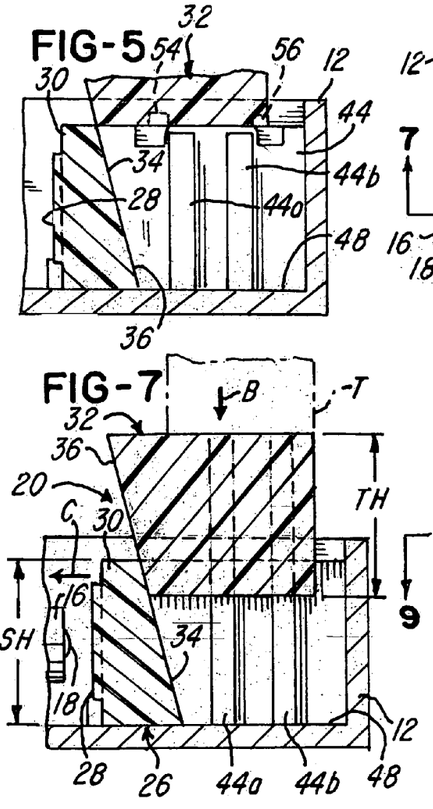
FIG. 5 is a fragmentary sectional view taken along the line 5—5 in FIG. 4.
FIG. 7 is a fragmentary sectional view taken along the line 7—7 in FIG. 6.
Figure 8:
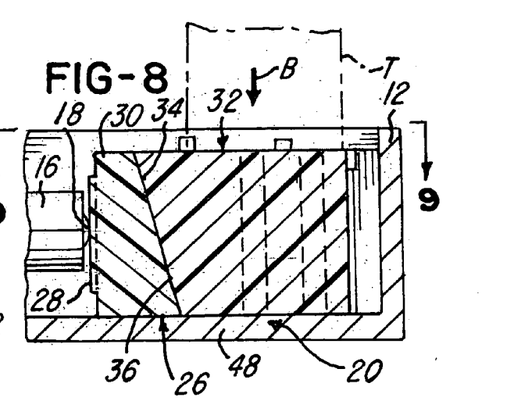
FIG. 8 is a fragmentary sectional view illustrating a tool used to drive the plunger until a thrust surface of the slider body engages an end of an armature of the electric motor.
Figure 9:
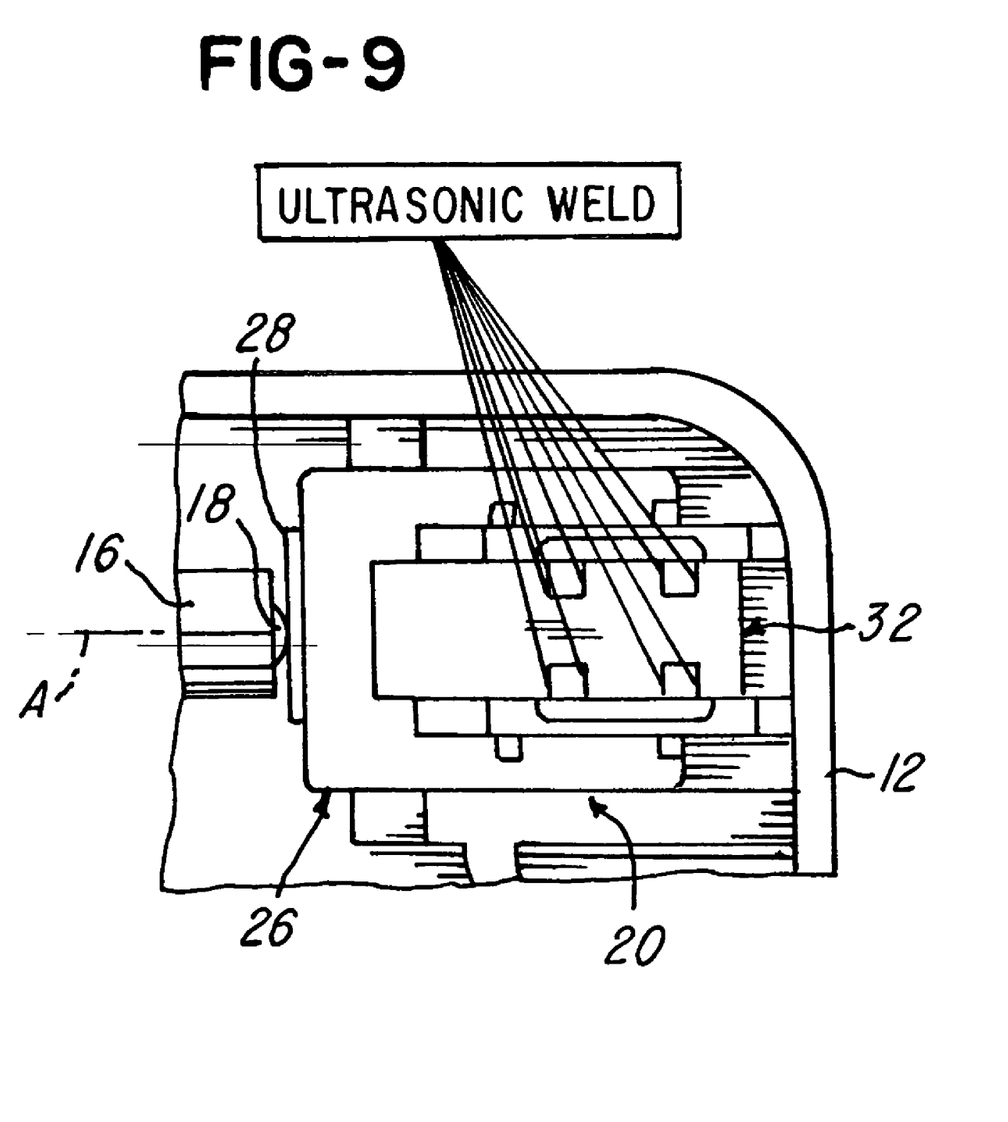
FIG. 9 is a fragmentary plan view illustrating the various points at which an ultrasonic weld may be performed to secure the plunger to the housing and/or the slider body.

As best illustrated in the views of FIGS. 2–10, the endplay adjustment system 20 facilitates adjusting longitudinal or axial endplay in a direction of axis (labeled as A in FIG. 2) of armature 16. The endplay adjustment system 20 comprises a slider body 26 comprising a thrust area or thrust surface 28 that is mounted or integral with a thrust wall 30. As will be described later herein, the slider body 26 is generally U-shaped as illustrated and is moveable or slides in the direction of axis A in order to permit the thrust surface 28 to move towards and engage the end 18 as illustrated in FIGS. 7–9. Notice that the end 18 is engaged by the thrust surface 28 and the thrust surface 28 lies in a plane that is generally perpendicular to the axis A of the armature 16.

The adjustment system 20 further comprises a wedge or plunger 32 which engages the generally U-shaped slider body 26 in order to drive the thrust surface 28 towards and against the end 18 in the manner described later herein. The plunger 32 and slider body 26 are molded from fiber-glass reinforced thermoplastic polyester or similar high performance engineering thermoplastic and may be a two-piece construction or, preferably, a one-piece construction as described relative to FIG. 10 herein.

As best illustrated in FIGS. 2–8, the slider body 26 comprises an angled surface 34 that is situated on an opposite side of the thrust wall 30. In the embodiment being illustrated, the angled surface 34 and the thrust surface 28 define an angle θ. Notice that the plunger 32 also comprises an angled surface 36 that mates with and engages the angled surface 34 such that when the plunger 32 is driven in the direction of arrow B (FIG. 7), the slider body 26 moves in the direction of arrow C until it engages the end 18 of armature 16 as illustrated in FIGS. 6–9.

As shown in FIGS. 2–8, the housing 12 comprises a first housing wall 40, a second housing wall 42, a third housing wall 44 and a fourth housing wall 46 which are generally parallel to each other and perpendicular to a generally planar housing bottom 48. In the embodiment being described, the housing 12 is injection molded fiber-glass reinforced thermoplastic polyester or similar high performance engineering thermoplastic. Notice that the third and fourth housing walls 44 and 46 each comprise a plurality of projections 44a, 44b, 46a and 46b which are received in alignment channels 32a, 32b, 32c and 32d, respectively, of plunger 32. The alignment channels 32a, 32b, 32c and 32d facilitate preventing undesired longitudinal or axial movement of the plunger 32 in the direction of the axis A (such as in the direction of arrow C in FIG. 7) after the plunger 32 is received in housing 12.

Figure 10:
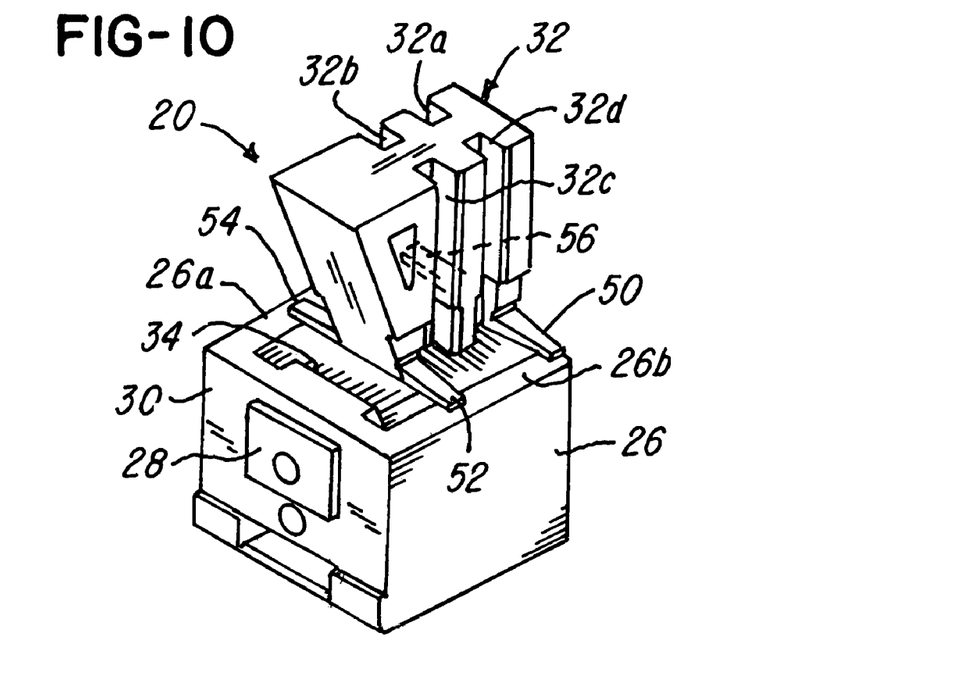
FIG. 10 is a perspective view of the plunger integrally provided with the slider body, illustrating a generally perpendicular thrust surface.

The endplay adjustment system 20 may be provided such that the plunger 32 is integrally formed with the slider body 26 as illustrated in FIG. 10. Integrally molded attachment fingers 50, 52, 54 and 56 (shown in phantom in FIG. 10) couple the plunger 32 to the top of the slider body as shown in FIG. 10.

Figure 2:
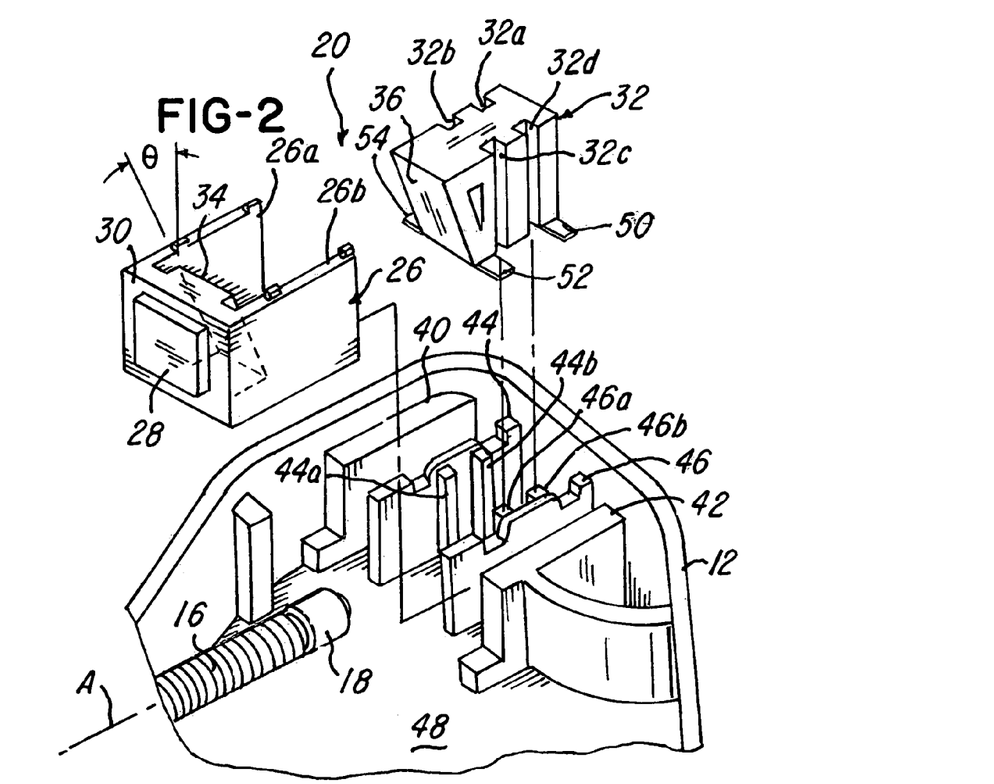
FIG. 2 is an exploded fragmentary view of the endplay adjustment system used with the electric motor.

Notice that walls 40 and 44 define a first channel 58 and walls 42 and 46 define second channel 60. As illustrated in FIGS. 2–4, notice that the slider body 26 is U-shaped and comprises a first leg portion 26a and a second leg portion 26b that are joined by the thrust wall 30. When the endplay adjustment system 20 is inserted into the housing 12, the first and second leg portions 26a and 26b are received in the first and second channels 58 and 60, respectively, as illustrated in FIG. 4. At this point, notice that the plunger 32 is situated above the plunger-receiving area 62 as illustrated in FIG. 5. Notice also that the walls 44 and 46 define a plunger receiving area 62 for receiving the plunger 32. When it is desired to mount the plunger 32 and slider body 26 into the housing 12, the slider body 26 is inserted into the housing 12. When plunger 32 is forced downward (as viewed in FIGS. 8–10), the attachment fingers 50, 52, 54 and 56 break, thereby permitting the plunger 32 to be received in plunger-receiving area 62.

Figure 6:
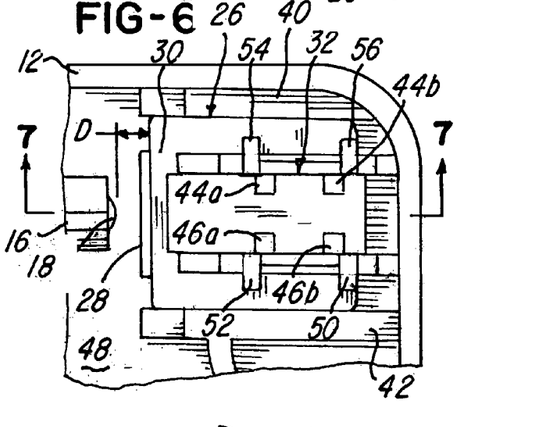
FIG. 6 is a fragmentary plan view illustrating the plunger body when it is beginning to drive the slider body.

Notice that there is an endplay gap, defined by double arrow D in FIG. 6, after the slider body 26 is mounted in housing 12, which the endplay adjustment system 20 facilitates overcoming. After the generally U-shaped slider body 26 is inserted into the housing 12, as illustrated in FIGS. 4–6, a tool T (shown in phantom in FIGS. 7 and 8) may be used to drive the plunger 32 in the direction of arrow B in FIG. 7. At this point, the attachment fingers 50–56 break to permit the plunger 32 to be driven by the tool T in the direction of arrow B until the angled surface 36 of plunger 32 engages the angled surface 34 of slider body 26. The plunger 32 is driven until thrust surface 28 engages end 18, thereby reducing or eliminating the endplay gap D (FIG. 6). In the embodiment being illustrated, the plunger 32 is shown as having been driven until it bottoms out against housing wall or surface 48. It should be understood, however, that the plunger 32 could have a height PH (FIG. 7) that is the same, greater or even smaller than the height SH of the slider body 26. Also, note that the angled surfaces 34 and 36 could define the angle θ to be about twenty (20) degrees or, alternatively, at an angle that is greater than or less than the angle θ shown in the illustration.

After the plunger 32 is driven until the thrust surface 28 engages the end 18 of armature 16, as illustrated in FIGS. 8 and 9, the plunger 32 is then secured to the wall 44 and 46 of housing 12 and may also be secured to the slider body 26 so that the slider body 26 and plunger 32 do not move. In an illustrative embodiment, the projections 44a, 44b, 46a and 46b may be adhered to or welded (such as by an ultrasonic weld) directly to the plunger 32 walls that define the channels 32a, 32b, 32c and 32d, as shown and/or the slider body 26 at the various areas shown in FIG. 9.

Advantageously, the endplay adjustment system 20 provides a convenient and easy means for reducing or eliminating endplay. By using a thrust surface 28 and thrust wall 30 that is generally perpendicular to an axis A of the armature shaft 16, the invention facilitates reducing side loads on the armature shaft 16 and the desired worm to gear interface is maintained when the motor thrusts in either direction. The perpendicular thrust face 28 also facilitates minimizing any bending stress on the armature shaft 16. The ultrasonic welding or securing of the plunger 32 into the walls 44 and 46 of housing 12 and/or slider body 26 after precise adjustment is made facilitates reducing any movement of the slider body 26.

Moreover, unlike the adjustment systems of the past that use interlocking ribs that had to flex, the system 20 may be made from a stiffer, more robust material or a material having a higher modulus of elasticity because there is no requirement for any portions of the plunger 32 or slider body 26 to flex or bend. The ability of system 20 to utilize higher grade materials provides long term benefits throughout the life of the product. The reduction or elimination of the gap between the end 18 of armature 16 and the thrust surface 28 of slider body 26 facilitates precise endplay adjustment and eliminating the gap (FIG. 7) which, in turn, reduces or eliminates any noise associated with the endplay adjustment system of the past.

While the systems and methods herein described, and the forms of apparatus for carrying these systems and methods into effect, constitute one embodiment of this invention, it is to be understood that the invention is not limited to these precise methods and forms of apparatus, and that changes may be made in either without departing from the scope of the invention, which is defined in the appended claims.

What is claimed is:

1. An end play adjustment system for reducing axial end play in an electric motor having a housing having at least one projection or channel, said end play adjustment system comprising:
   a slider body comprising a thrust wall for driving into an end of an armature of said electric motor; and
   a plunger having a first angled surface for engaging said slider body in order to drive said slider body until said thrust wall engages said end of said armature, said plunger comprising at least one plunger channel or projection for cooperating with at least one projection or channel, respectfully, to facilitate preventing the plunger from moving in a direction coaxial with an axis of said armature;
   said thrust wall lying in a plane that is substantially perpendicular to said axis of said armature.

2. The end play adjustment system as recited in claim 1 wherein said slider body comprises a second angled surface situated on a side opposite said thrust wall, said first angled surface of said plunger engaging said second angled surface of said slider body when said plunger is received in said housing.

3. The end play adjustment system as recited in claim 1 wherein said housing comprising a plunger-receiving area defined by a plurality of housing walls, said slider body comprising a second angled surface situated on a side opposite said thrust wall, said first angled surface of said plunger engaging said second angled surface of said slider body when said plunger is received in said plunger-receiving area.

4. The end play adjustment system as recited in claim 3 wherein said first angled surface is situated between a first plunger wall and a second plunger wall, said plurality of housing walls defining at least a first housing wall and a second housing wall, said first and second housing walls being situated in opposed relation to said first plunger wall and said second plunger wall when said plunger is situated therebetween.

5. The end play adjustment system as recited in claim 1 wherein said slider body is generally U-shaped and comprises a first leg portion, a second leg portion and said thrust wall for joining said first and second leg portions.

6. The endplay adjustment system as recited in claim 1 wherein said plunger is secured to said housing.

7. The endplay adjustment system as recited in claim 6 wherein said plunger is ultrasonically welded to said housing to weld it thereto.

8. The endplay adjustment system as recited in claim 1 wherein said plunger is ultrasonically welded to said housing and said plunger.

9. The endplay adjustment system as recited in claim 1 wherein system further comprises:
   a coupler for coupling said plunger to said slider body in a pre-deployment position.

10. The end play adjustment system as recited in claim 9 wherein said coupler comprises a plurality of attachment fingers integrally molded to and coupling said plunger and said slider body.

11. The endplay adjustment system as recited in claim 10 wherein said plunger and said slider body are fiber glass reinforced thermoplastic polyester or thermoplastic.

12. The endplay adjustment system as recited in claim 1 wherein said plunger and said slider body are fiber glass reinforced thermoplastic polyester or s thermoplastic.

13. An end play adjustment system for reducing axial end play in an electric motor having a housing, said end play adjustment system comprising:
   a slider body comprising a thrust wall for driving into an end of an armature of said electric motor; and
   plunger having a first angled surface for engaging said slider body in order to drive said slider body until said thrust wall engages said end of said armature;
   said thrust wall lying in a plane that is substantially perpendicular to an axis of said armature;
   wherein said housing comprises a plunger-receiving area defined by a plurality of housing walls, said slider body comprising a second angled surface situated on a side opposite said thrust wall, said first angled surface of said plunger engaging said second angled surface of said slider body when said plunger is received in said plunger-receiving area;
   when said first angled surface is situated between a first plunger wall and a second plunger wall, said plurality of housing walls defining at least a first housing wall and a second housing wall, said first and second housing walls being situated in opposed relation to said first plunger wall and said second plunger wall when said plunger is situated therebetween; and
   wherein each of said first plunger wall and said second plunger comprising an alignment channel, said first housing wall and said second housing wall each comprising a projection received in said alignment channels to facilitate preventing said plunger from moving in a direction coaxial with said axis of said armature.

14. The endplay adjustment system as recited in claim 13 wherein system further comprises:
   a coupler for coupling said plunger to said slider body in a pre-deployment position.

15. The end play adjustment system as recited in claim 14 wherein said coupler comprises a plurality of attachment fingers integrally molded to and coupling said plunger and said slider body.

16. An end play adjustment system for reducing axial end play in an electric motor having a housing, said end play adjustment system comprising:
   a slider body comprising a thrust wall for driving into an end of an armature of said electric motor;
   a plunger having a first angled surface for engaging said slider body in order to drive said slider body until said thrust wall engages said end of said armature;
   said thrust wall lying in a plane that is substantially perpendicular to an axis of said armature;
   wherein said housing comprising a plunger-receiving area defined by a plurality of housing walls, said slider body comprising a second angled surface situated on a side opposite said thrust wall, said first angled surface of said plunger engaging said second angled surface of said slider body when said plunger is received in said plunger-receiving area;
   wherein said slider body is generally U-shaped and comprises a first leg portion, a second leg portion and a thrust wall for joining said first and second leg portions, said housing defining a first channel and a second channel for receiving said first and second leg portions, respectively, in order to permit said U-shaped member to move towards said armature when said plunger is situated in said plunger-receiving area; and
   wherein each of said first plunger wall and said second plunger wall comprise an alignment channel, said first housing wall and said second housing wall each comprising a projection for receipt in said alignment channels, respectively, for aligning said plunger in said plunger-receiving area.

17. The endplay adjustment system as recited in claim 16 wherein said plunger is secured to said housing.

18. The endplay adjustment system as recited in claim 17 wherein said plunger is ultrasonically welded to both said housing and said slider body.

19. An electric motor assembly comprising:
   a housing for receiving an electric motor having an armature, said housing having at least one projection or channel;
   a gear driven by said armature and rotatably driving a drive shaft;
   an endplay adjustment system for reducing axial end play in the electric motor assembly, said end play adjustment system comprising:
      a slider body comprising a thrust wall for driving into an end of an armature of said electric motor; and
      a plunger having a first angled surface for engaging said slider body in order to drive said slider body until said thrust wall engages said end of said armature, said plunger comprising at least one plunger channel or projection for cooperating with said at least one projection or channel, respectively, to facilitate preventing the plunger from moving in a direction coaxial with said axis and said armature;
   said thrust wall lying in a plane that is substantially perpendicular to an axis of said armature.

20. The electric motor assembly as recited in claim 19 wherein said slider body comprises a second angled surface situated on a side opposite said thrust wall, said first angled surface of said plunger engaging said second angled surface of said slider body when said plunger is received in said housing.

21. The electric motor assembly as recited in claim 19 wherein housing comprising a plunger-receiving area defined by a plurality of housing walls, said slider body comprising a second angled surface situated on a side opposite said thrust wall, said first angled surface of said plunger engaging said second angled surface of said slider body when said plunger is received in said plunger-receiving area.

22. The electric motor assembly as recited in claim 21 wherein said first angled surface is situated between a first plunger wall and a second plunger wall, said plurality of housing walls defining at least a first housing wall and a second housing wall, said first and second housing walls being situated in opposed relation to said first plunger wall and said second plunger wall when said plunger is situated therebetween.

23. The electric motor assembly as recited in claim 21 wherein said slider body is generally U-shaped and comprises a first leg portion, a second leg portion and a thrust wall for joining said first and second leg portions, said housing defining a first channel and a second channel for receiving said first and second leg portions, respectively, in order to permit said U-shaped member to move towards said armature when said plunger is situated in said plunger-receiving area.

24. The electric motor assembly as recited in claim 19 wherein said slider body is generally U-shaped and comprises a first leg portion, a second leg portion and said thrust wall for joining said first and second leg portions.

25. The electric motor assembly as recited in claim 19 wherein said plunger is secured to said housing.

26. The electric motor assembly as recited in claim 25 wherein said plunger is ultrasonically welded to said housing to weld it thereto.

27. The electric motor assembly as recited in claim 19 wherein said plunger is ultrasonically welded to both said housing and said slider body.

28. The electric motor assembly as recited in claim 19 wherein said plunger is ultrasonically welded to said housing and said plunger.

29. The endplay adjustment system as recited in claim 19 wherein system further comprises:
   a coupler for coupling said plunger to said slider body in a pre-deployment position.

30. The end play adjustment system as recited in claim 29 wherein said coupler comprises a plurality of attachment fingers integrally molded to and coupling said plunger and said slider body.

31. The endplay adjustment system as recited in claim 19 wherein said plunger and said slider body are fiber glass reinforced thermoplastic polyester or thermoplastic.

32. An electric motor assembly comprising:
   a housing for receiving an electric motor having an armature;
   a gear driven by said armature and rotatably driving a drive shaft;
   an endplay adjustment system for reducing axial end play in the electric motor assembly, said end play adjustment system comprising:
      a slider body comprising a thrust wall for driving into an end of an armature of said electric motor; and
      a plunger having a first angled surface for engaging said slider body in order to drive said slider body until said thrust wall engages said end of said armature;
   said thrust wall lying in a plane that is substantially perpendicular to an axis of said armature;

wherein said housing comprising a plunger-receiving area defined by a plurality of housing walls, said slider body comprising a second angled surface situated on a side opposite said thrust wall, said first angled surface of said plunger engaging said second angled surface of said slider body when said plunger is received in said plunger-receiving area;

wherein said first angled surface is situated between a first plunger wall and a second plunger wall, said plurality of housing walls defining at least a first housing wall and a second housing wall, said first and second housing walls being situated in opposed relation to said first plunger wall and said second plunger wall when said plunger is situated therebetween; and wherein each of said first plunger wall and said second plunger wall comprising an alignment channel, said first housing wall and said second housing wall each comprising a projection received in said alignment channels to facilitate preventing said plunger from moving in a direction coaxial with said axis of said armature.

33. The endplay adjustment system as recited in claim 32 wherein said plunger and said slider body are fiber glass reinforced thermoplastic polyester or thermoplastic.

34. An electric motor assembly comprising:
a housing for receiving an electric motor having an armature;
a gear driven by said armature and rotatably driving a drive shaft;
an endplay adjustment system for reducing axial end play in the electric motor assembly, said end play adjustment system comprising:
a slider body comprising a thrust wall for driving into an end of an armature of said electric motor; and
a plunger having a first angled surface for engaging said slider body in order to drive said slider body until said thrust wall engages said end of said armature;
said thrust wall lying in a plane that is substantially perpendicular to an axis of said armature;
wherein said housing comprises a plunger-receiving area defined by a plurality of housing walls, said slider body comprising a second angled surface situated on a side opposite said thrust wall, said first angled surface of said plunger engaging said second angled surface of said slider body when said plunger is received in said plunger-receiving area;
wherein said slider body is generally U-shaped and comprises a first leg portion, a second leg portion and a thrust wall for joining said first and second leg portions, said housing defining a first channel and a second channel for receiving said first and second leg portions, respectively, in order to permit said U-shaped member to move towards said armature when said plunger is situated in said plunger-receiving area; and
wherein each of said first plunger wall and said second plunger wall comprise an alignment channel, said first housing wall and said second housing wall each comprising a projection for receipt in said alignment channels, respectively, for aligning said plunger in said plunger-receiving area.

35. The electric motor assembly as recited in claim 34 wherein said plunger is secured to said housing.

36. The endplay adjustment system as recited in claim 34 wherein system further comprises:
a coupler for coupling said plunger to said slider body in a pre-deployment position.

37. The end play adjustment system as recited in claim 36 wherein said coupler comprises a plurality of attachment fingers integrally molded to and coupling said plunger and said slider body.

38. A method for reducing endplay in an electric motor assembly comprising a housing, having at least one projection or channel, said method comprising the steps of:
situating a slider in operative relationship with an armature, said slider comprising a thrust wall for engaging an end of the armature;
situating a plunger in operative relationship to said slider, said plunger comprising at least one plunger channel or projection for cooperating with said at least one projection or channel, respectively, to facilitate preventing the plunger from moving in a direction coaxial with said axis and said armature; and
driving said plunger into engagement with said slider until said thrust wall engages said end of said armature.

39. The method as recited in claim 38 wherein said method further comprising the step of:
situating a generally U-shaped slider in said housing.

40. The method as recited in claim 38 wherein said housing comprises a first channel situated in opposed relation to a second channel, said method further comprising the step of:
providing a U-shaped slider comprising a first leg portion and a second leg portion joined by said thrust wall;
situating said first and second leg portions in said first and second channels, respectively.

41. The method as recited in claim 38 wherein said method further comprising the step of:
ultrasonically welding said plunger to said housing.

42. The method as recited in claim 38 wherein said method further comprising the step of:
ultrasonically welding said plunger to said housing and said slider.

43. The method as recited in claim 38 wherein said method further comprises the step of:
providing an integrally molded plunger and slider body wherein said plunger is situated in a pre-deployed position relative to said slider body.

44. The method as recited in claim 38 wherein said plunger is integrally attached to said slider body with a plurality of attachment fingers so that said plunger is situated in a pre-deployed position relative to said slider body, said method further comprising the step of:
forcing said plunger toward an open area defined by said slider body until said plurality of attachment fingers break, thereby enabling said plunger to be position in said housing.

45. A method for reducing endplay in an electric motor assembly comprising a housing, said method comprising the steps of:
situating a slider in operative relationship with an armature, said slider comprising a thrust wall for engaging an end of the armature;
situating a plunger in operative relationship to said slider; and
driving said plunger into engagement with said slider until said thrust wall engages said end of said armature;
wherein said housing comprises a plurality of wails defining a first channel situated and a second plurality of walls defining a second channel, said method further comprising the step of:

providing a U-shaped slider comprising a first leg portion and a second leg portion joined by said thrust wall;

situating said first leg portion in said first channel and said second leg portion in said second channel;

providing a plunger comprising alignment channels that cooperate with projections on said housing to facilitate preventing said plunger from moving in a direction coaxial with an axis of said armature.

46. The method as recited in claim 45 wherein said method further comprising the step of:

securing said plunger to said housing and said slider.

47. The method as recited in claim 46 wherein said method further comprising the step of:

ultrasonically welding said plunger to said housing and said slider.

* * * * *

UNITED STATES PATENT AND TRADEMARK OFFICE
CERTIFICATE OF CORRECTION

PATENT NO.        : 7,116,025 B2
APPLICATION NO.   : 10/742967
DATED             : October 3, 2006
INVENTOR(S)       : Robert Scott Myerly and Clark F. Wilson It is certified that error appears in the above-identified patent and that said Letters Patent is hereby corrected as shown below:

On the title page

Item (73) - Change "Valeo Electric Systems, Inc." to --Valeo Electrical Systems, Inc.--

Signed and Sealed this

Sixth Day of November, 2007

JON W. DUDAS
*Director of the United States Patent and Trademark Office*